(12) United States Patent
Steingroever et al.

(10) Patent No.: US 6,538,434 B1
(45) Date of Patent: Mar. 25, 2003

(54) MAGNETICALLY RESPONSIVE DEVICE FOR MEASURING THE THICKNESS OF MAGNETIC FILMS

(75) Inventors: Erich Steingroever, Bonn (DE); Thomas Rohde, Köln (DE)

(73) Assignee: ElektroPhysik Dr. Steingroever GmbH KG (DE)

( * ) Notice: Subject to any disclaimer, the term of this patent is extended or adjusted under 35 U.S.C. 154(b) by 40 days.

(21) Appl. No.: 09/698,116

(22) Filed: Oct. 30, 2000

(30) Foreign Application Priority Data

Nov. 3, 1999 (DE) .......................................... 199 53 061

(51) Int. Cl.[7] .............................. G01B 7/06; G01R 33/12
(52) U.S. Cl. ........................................ 324/230; 33/834
(58) Field of Search ................................ 324/229–231; 33/501.04, 834

(56) References Cited

U.S. PATENT DOCUMENTS

| 4,164,707 A | | 8/1979 | Nix | |
|---|---|---|---|---|
| 4,400,665 A | * | 8/1983 | Nix | 324/230 |
| 4,459,550 A | * | 7/1984 | Nix | 324/230 |

FOREIGN PATENT DOCUMENTS

| DE | 263848 C2 | | 9/1913 | |
|---|---|---|---|---|
| DE | 205518 | * | 12/1983 | 324/230 |

* cited by examiner

Primary Examiner—Gerard R. Strecker
(74) Attorney, Agent, or Firm—Harold Gell

(57) ABSTRACT

A device for measuring the thickness of films or coatings on bases wherein the film thickness is determined from the magnetic adhesive force of a permanent magnet on the surface of the film to be measured. The device includes a permanent magnet attached to an end of a lever arm mounted at its center of gravity, forming a rotary system which includes an electromagnet counterbalancing the permanent magnet. The magnetic adhesive force between the permanent magnet and film is overcome by the variable force of the magnetic field of the electromagnet acting on the lever arm of the rotary system, the value of which, as the permanent magnet is lifted off the film, is used as a measure of the film thickness. In the best mode of operation, this is accomplished by integrating the time required to raise the current applied to the electromagnet to the value which generates a magnetic field which overcomes the adhesive force between the film and permanent magnet.

47 Claims, 5 Drawing Sheets

MAGNETICALLY RESPONSIVE DEVICE FOR MEASURING THE THICKNESS OF MAGNETIC FILMS

BACKGROUND OF THE INVENTION

1. Field of the Invention

The invention belongs in the class of devices for measuring the thickness of films on bases as a function of the apparent magnetic attraction, i.e. adhesive force, between the surface of the film to be measured and a permanent magnet.

2. Discussion of the Related Art

German Patent DE 26 38 48 C2 discloses a magnetic film thickness measuring device in which the adhesive force on the film to be measured exerted by a permanent magnet, rotatably arranged on a measuring arm mounted at the center of gravity and hence counter-balanced, serves as a measure of film thickness. The measurement is taken by means of a spring which is tightened by rotating a drive element. The device has a dial divided into layer thicknesses, a marker being provided on the housing of the device for taking a reading, as well as a locking member between the measuring arm and dial which sets the dial depending on the movement of the permanent magnet as it pulls away.

Thickness-measuring devices of this type have a tendency to produce differences in the values of measured film thicknesses due to the fact that the dial, which increases the spring tension as it is rotated to lift the permanent magnet off the film to be measured as the adhesive force is overcome, is difficult to halt exactly at the instant when the permanent magnet is lifted. In addition, because the dial is rotated manually, the rotation speed is not always the same. This causes discrepancies in the measurement values when taking a series of measurements. The problem cannot be readily eliminated using spring bias technology.

A known approach to simplify the measuring procedure and improve the measuring accuracy of such thickness-measuring devices is to provide the rotatable drive element with a mechanical locking mechanism with gears and a high-speed flywheel of the type used in a clock mechanism as illustrated in U.S. Pat. No. 4,164,707 issued to N. Nix. In this device, an escapement like locking member is arranged between the rear lever arm of the counter-balanced rotary system and the high-speed flywheel so that the high-speed flywheel is checked as the drive element is tightened and not released until the instant at which the lever arm of the rotary system incorporating the permanent magnet is placed on the film to be measured. Once the high-speed flywheel is released, the drive element for the rotary system is displaced by the pre-stressed spring during rotation at a constant speed until the attractive force of the permanent magnet is overcome and the latter is abruptly lifted from the film being measured. At this instant, the high-speed flywheel is also halted by the locking member disposed on the rear lever arm. A reading of the measuring film thickness can then be taken from the dial.

Thickness measuring devices with an automatic locking mechanism of this type, which is activated at the instant at which the permanent magnet is lifted from the film being measured, are expensive to produce and require a lot of maintenance.

OBJECTIVES OF THE INVENTION

The primary objective of the invention is to provide an inexpensive thickness-measuring device with improved handling and measuring accuracy.

In a first advantageous embodiment, a magnetically soft compensating element attached to the rotary system of the permanent magnet is attracted to or repelled by the magnetic field of the electromagnet.

Alternatively, in another embodiment, a magnetically hard compensating element may be attached to the rotary system of the permanent magnet and attracted to or repelled by the magnetic field of the electromagnet.

In another advantageous embodiment, the measuring device may also be designated so that the variable magnetic field of a coil acts directly on the permanent magnet. This may be set up by arranging the electromagnet in the housing of the measuring device, coaxially with and above the permanent magnet.

However, the electromagnet may also be affixed to the rotary system and act on a magnetically soft or hard body which is stationary relative to the rotary system.

In another alternative embodiment, the electromagnet attached to the rotary system may be displaced between two permanent magnets which are stationary relative to the point of rotation.

SUMMARY OF THE INVENTION

According to the present invention, there is provided a thickness-measuring device for films in which the film thickness is determined from the adhesive force of a permanent magnet on the surface of the film to be measured. The device comprises a rotary system mounted at its center of gravity, a permanent magnet carried on the rotary system and an electromagnet. The adhesive force of the permanent magnet is overcome by the variable force of the magnetic field of the electromagnet acting on the rotary system and the value thereof as the permanent magnet is lifted off the film is used as a measure of film thickness.

A thickness measuring device embodying the present invention has an advantage over the prior art in that the force required to overcome the adhesive force of the permanent magnet on the film to be measured does not have to be applied by means of a spring and complicated mechanism for halting the element driving the rotary system at the instant the permanent magnet is lifted from the film to be measured.

In a preferred embodiment, the variable current which activates the electromagnet is used as a measurement of film thickness. Furthermore, the value of the compensation force as the permanent magnet is pulled away is advantageously converted into film thickness by means of an electronic system and can be indicated on a display as a readout depicting physical dimensions.

Particularly high measuring accuracy is obtained by detecting the point on the current curve of the electromagnet when the permanent magnet is pulled away from the film to be measured. This point is readily identified by the fluctuation in the current curve caused by the sudden movement of the electromagnet coil relative to a core at the point of release of the permanent magnet from the film being measured. The current value may be converted into film thickness, however, the fluctuations generated at separation are current level fluctuations which can cause erroneous readings. To avoid this error source, the electronic system generates a linearly increasing current application to the electromagnet and measures the time from first current application to fluctuation and that time value is what is actually interpreted as film thickness. As a result, the invention offers another feature whereby the time to the signal in the current curve, generated as the permanent magnet is pulled away from the film, is used to cut off the current to the electromagnet.

DESCRIPTION OF THE PREFERRED EMBODIMENT

Figure 1:
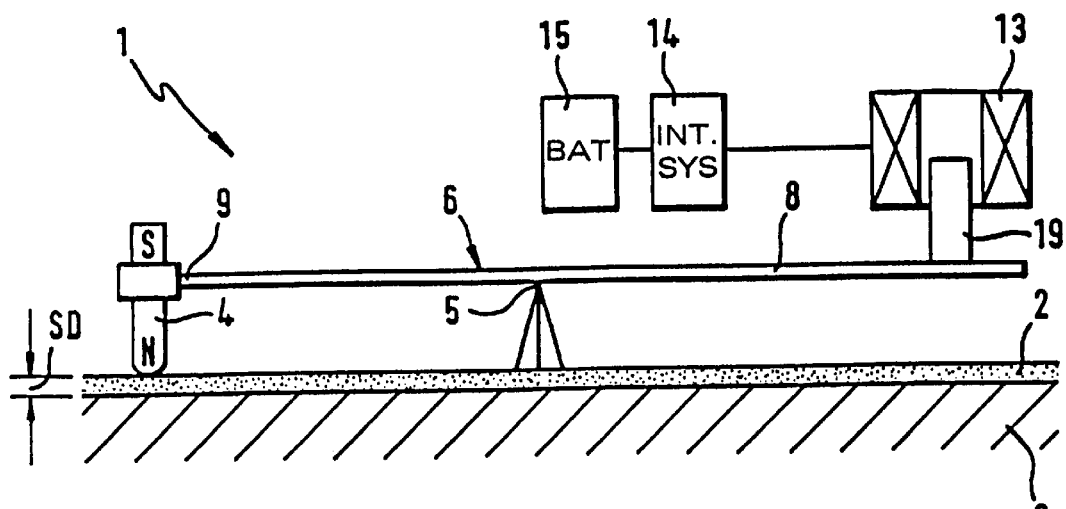
FIG. 1 is a schematic diagram of the invention for measuring the thickness of films or coatings as a function of the magnetic adhesion of a permanent magnet to the film.

The thickness-measuring device schematically illustrated in FIG. 1 determines the thickness, SD, of coatings or films 2 on bases or substrates 3 having dissimilar magnetic properties, examples of which are contained in Table 1. The film thickness, SD, is determined from the adhesive force of a permanent magnet 4 on the surface of the film 2 to be measured, i.e. the magnetic attraction between the permanent and the combination of film 2 and base 3. This is accomplished by a rotary system 6 including a beam supported at its center of gravity 5. The beam bears a permanent magnet 4 at one end and an electromagnet 13 at its other end. The electromagnet provides a balancing force as a function of applied current which is equated to film thickness, SD. In addition, the invention may be used to measure the thickness of strata of known magnetic properties. The operating principles of the thickness-measuring device proposed by the invention will be explained with reference to this drawing in conjunction with the diagram of FIG. 2.

TABLE 1

| Film or Coating to be Measured | Base or Substrate |
| --- | --- |
| Non-Magnetic | Ferromagnetic (i.e., Steel, etc.) |
| Weak Magnetic (i.e, Nickel, etc.) | Non-Magnetic |
| Weak Magnetic (i.e, Nickel, etc.) | Ferromagnetic (i.e., Steel, etc.) |

Note: The film/base combinations in the above table are exemplary and not meant to be limiting on the applications of the invention. For instance, the films or coatings may be weak magnetic coatings selected from the group comprising nickel and metals having similar magnetic properties and the bases may be selected from the group comprising Non-Magnetic Metallic, Non-Ferrous, Non-Metallic, Ferromagnetic and Weak Magnetic.

The rotary system 6 is mounted in the housing 11 (FIG. 3) of the measuring device 1 on a rotary shaft 7 (FIG. 3) which is the pivot point about which a counter-balanced lever arm 8 rotates. A permanent magnet 4 serving as a measuring magnet is mounted on the front end 9 of the lever arm. The poles of the permanent magnet are indicated by N and S in FIG. 1.

A pin 10 descends from the rear section of the lever arm so that it protrudes through a hole 12 in the bottom of the housing 11 as the permanent magnet 4 is pulled away from the surface of the tested film 2. The pin 10 is depressed with the finger to re-apply the permanent magnet 4 to the measuring surface so as to repeat the measurement.

In the measuring device proposed by the invention, the adhesive force (magnetic attractive force) of the permanent magnet 4 is overcome by the variable force of the magnetic field of an electromagnet coil 13 acting on the rotary system 6. The value thereof at the instant the permanent magnet 4 is lifted from the film 2 is used as a measure of the film thickness SD. This value is determined, in the preferred embodiments, as a function of time from the first application of current to the electromagnet coil 13 until a current fluctuation occurs as the result of the sudden movement of the coil relative to a core 19 as illustrated in FIG. 2.

Figure 3:
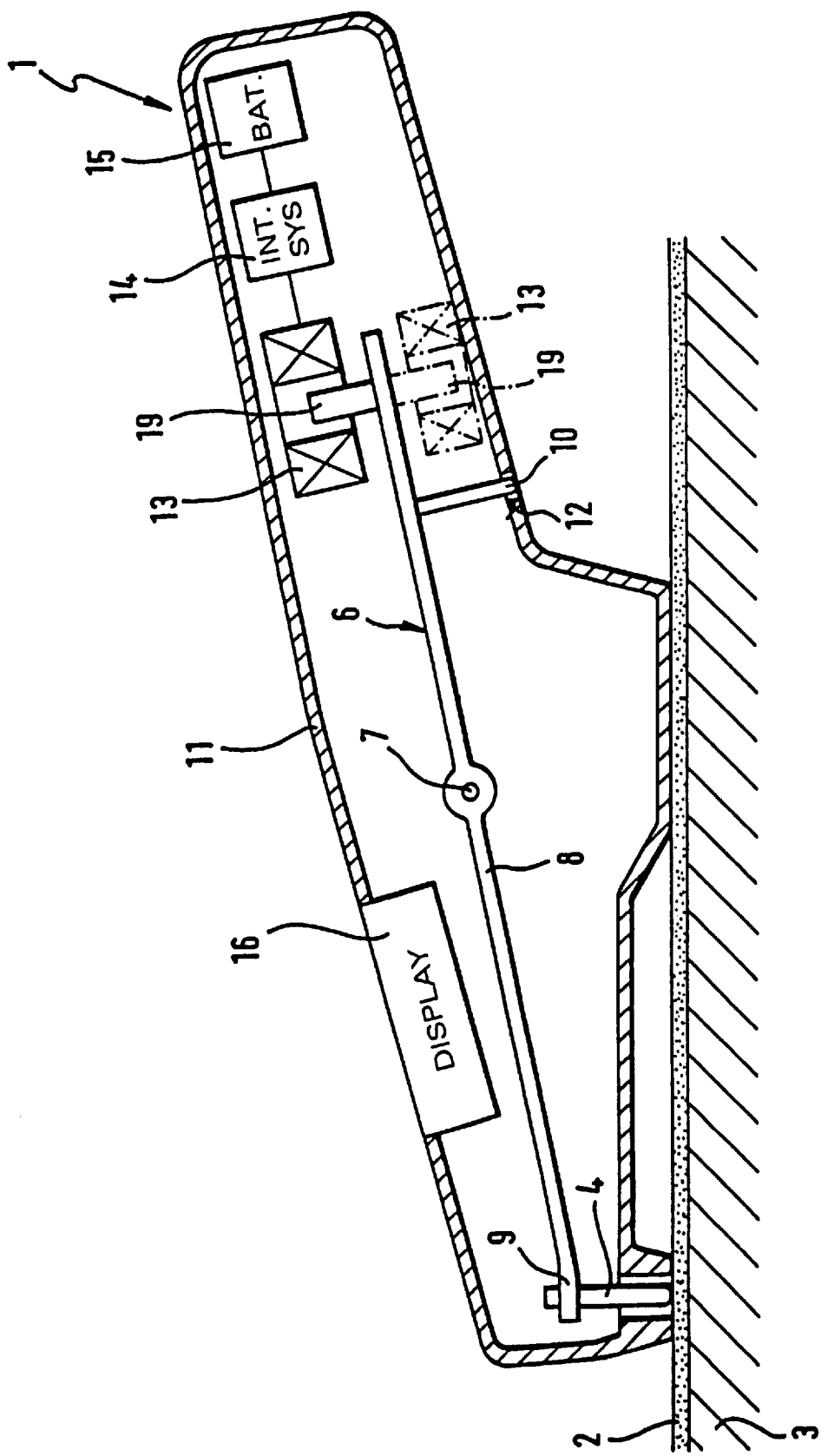
FIG. 3 is a longitudinal section through a first embodiment of a thickness-measuring device of the invention with an electromagnet arranged on the rear end of a lever arm of a rotary system.

Accordingly, the current I from a battery 15 used to activate the electromagnet 13 serves as a measure of the film thickness SD. The current is varied by an electronic system 14. As the permanent magnet 4 is pulled away from the film 2 to be measured, the electronic system 14 converts the value of the compensation force of the magnetic field of the coil 13 into film thicknesses, as a function of current value or time as previously indicated, and a reading is indicated on the display 16 (FIG. 3).

The electronic system 14 controls the measuring process, evaluation, and display of the measurement. It is designed to detect a rapid fluctuation in the current driving the electromagnet. As may be seen from the current curve shown in FIG. 2, a fluctuation, signal 17, in the current curve 18 of the electromagnet 13 is generated as the permanent magnet 4 is pulled away from the film 2 to be measured. This signal is detected and the current value at the point on the curve where the fluctuation occurred is converted into film thicknesses SD by means of the electronic system 14. The signal 17 in the current curve 18, generated as the permanent magnet 4 is pulled away from the film 2, is also used as a means to initiate cutting off the current I to the electromagnet 13.

Figure 2:
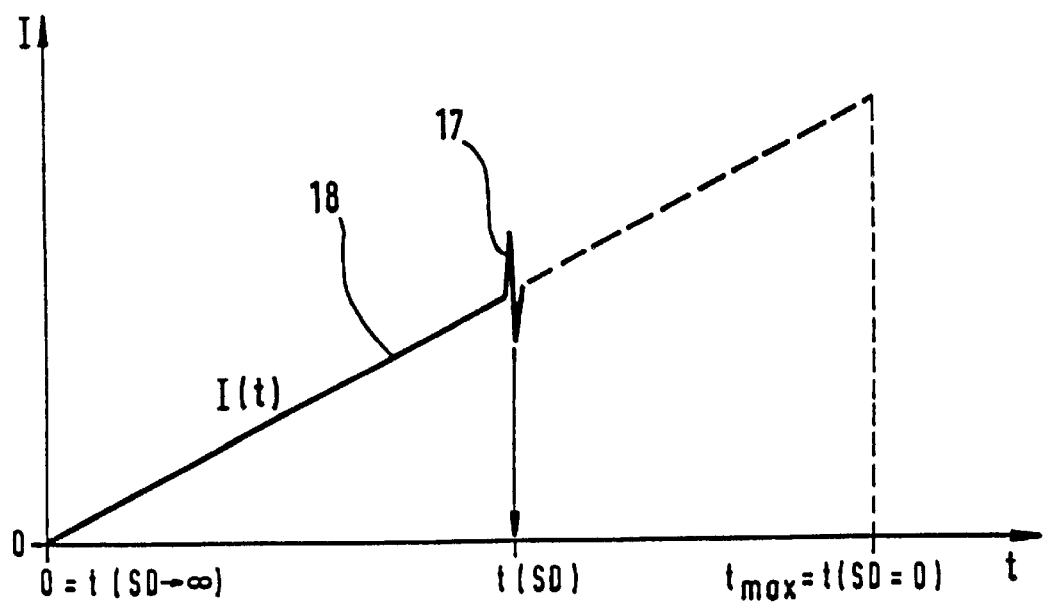
FIG. 2 is a graph showing how the attractive force of the permanent magnet is overcome by an electromagnet as a function of the current applied to the electromagnet as its strength increases as the current is increased over a period of time.

In a preferred embodiment, the electronic system generates an electrical current which increases from zero and progresses linearly toward infinity as illustrated by the current curve in FIG. 2. This is the current source for energizing the electromagnet. The electronic system may includes a variety of means for detecting the irregularity in the linear current curve which is created by movement of the electromagnet when the permanent magnet lifts from the surface of the film. However, a time integration is used in what is currently the best mode of operation. The value of the current and therefor the film thickness at the point of release is determined by measuring the elapsed time from the initiation of the current until the occurrence of the irregularity on the current curve. The measured elapsed time is converted into: 1) a readout of the thickness of the film presented on a display on the device housing and 2) a signal for terminating current application to the electromagnet.

Thus in the preferred embodiment, film thickness SD is determined as a function of time to eliminate irregularities induced by the fluctuation 17. In the diagram illustrated in FIG. 2, I(t) represents the current in the electromagnet 13. It is regulated to rise linearly from 0. "t" denotes the time or a time-proportional signal on the t-axis (current fluctuation 17) induced in the electromagnet current curve by the relatively sudden movement of the core 19 with respect to the electromagnet coil 13 as the permanent magnet 4 is lifted from the film 2. Thus SD is the film thickness calculated as a function of the time it takes for the fluctuation signal 17 to appear on the time axis of the current curve.

Figure 4:
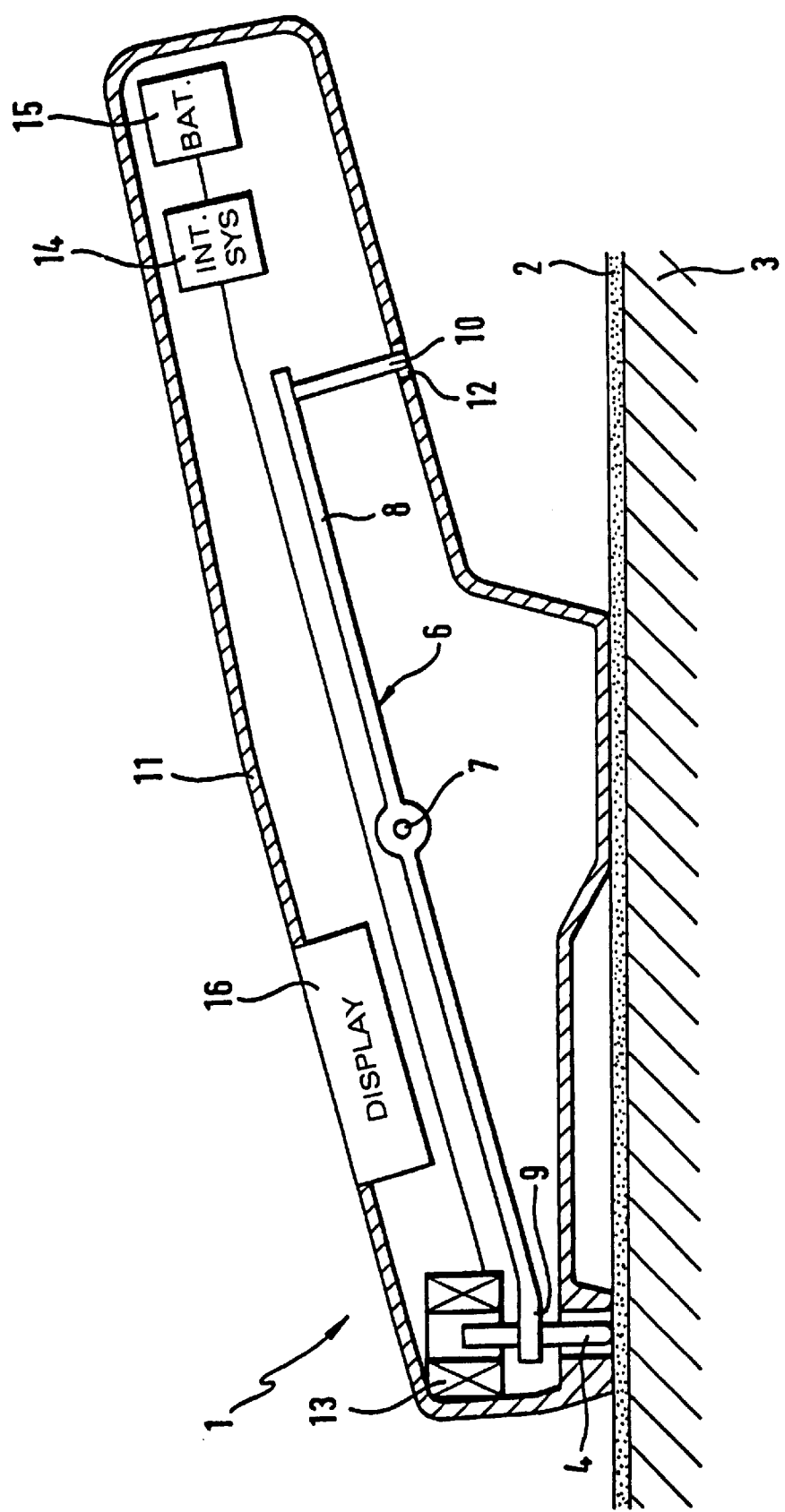
FIG. 4 is a longitudinal section through a second embodiment in which the electromagnet is arranged directly on the measuring magnet of the measuring device.
Figure 5:
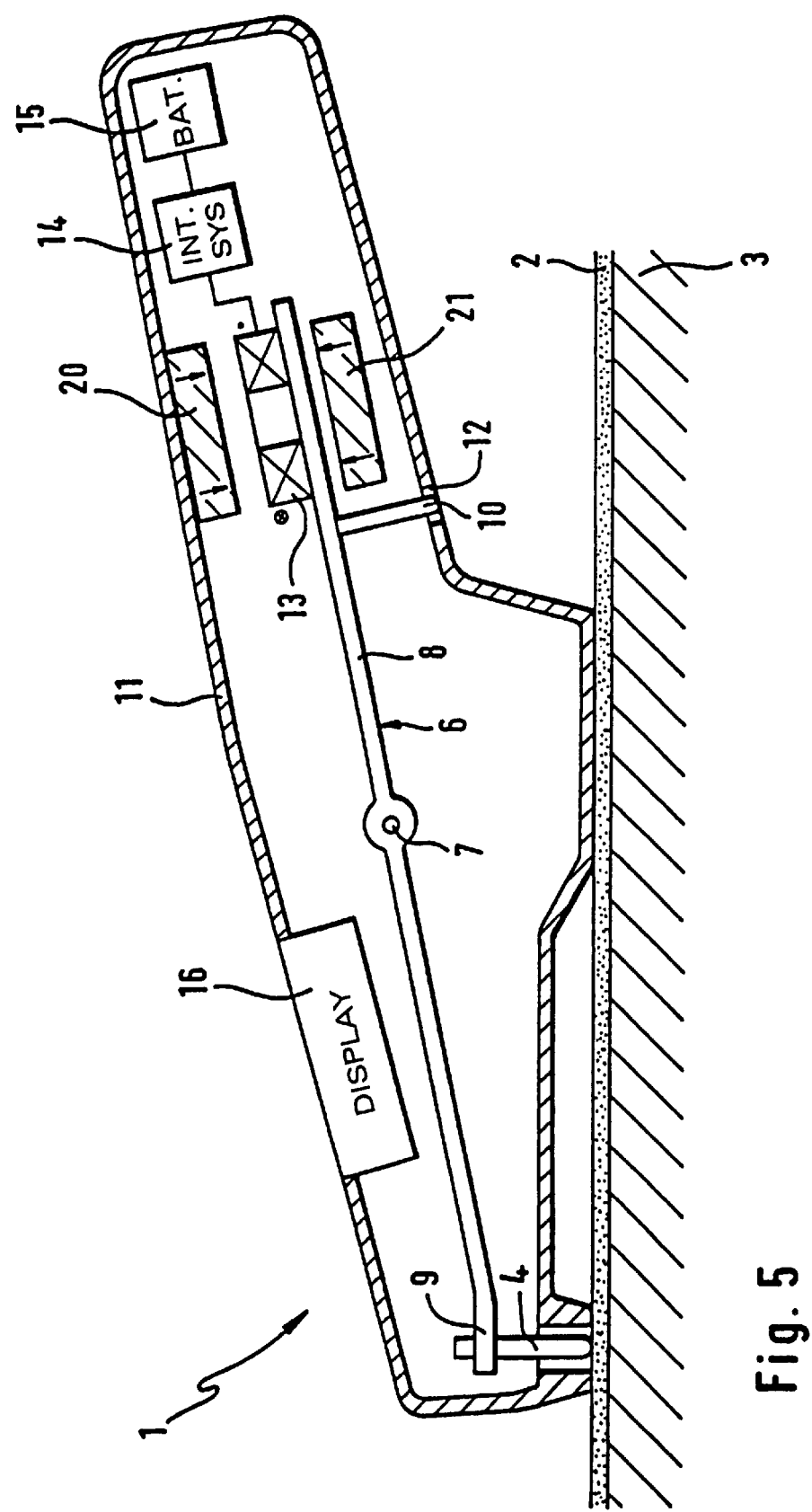
FIG. 5 is a longitudinal section through a third embodiment, in which the electromagnet is arranged on the rear of the lever arm of the rotary system between two permanent magnets.

In the embodiments of the invention illustrated in FIGS. 3 through 5, the thickness-measuring devices 1 use a rotary system 6 with a permanent magnet 4 (the measuring magnet) attached to the front end 9 of a rocker-type lever arm 8. The assembly includes an electromagnet 13, electronic system 14 and a battery 15 for applying current to the measuring system. These components are disposed in a housing 11 which is placed on the film 2 to be measured when the device 1 is operated. A display 16 is located at the top part of the housing 11, providing a digital readout of the measurement results.

The embodiment of the measuring system illustrated in FIG. 3 is designed so that a magnetically hard compensating element 19 for the measuring magnet 4 is attached to the rear end of the rotary system 6, which is attracted to or repelled by the magnetic field of the electromagnet 13.

In the layout illustrated by FIG. 3, when the electromagnet 13 is arranged above the magnetically hard core 19, the core is repelled when the electromagnet coil 13 is activated. If the electromagnet coil 13 and core 19 are arranged underneath the measuring arm 8, as indicated by the phantom presentation in FIG. 3, the core 19 will be attracted to the coil 13 and the permit magnet 4 at the front end of the rotary system 6 (the measuring magnet) will be pulled away from the film 2 to be measured.

However, the structure may also be such that a magnetically soft core 19 is attached to the end of the lever arm 8 opposite the permanent magnet 4. In this case the core is attracted to or repelled by the magnetic field of the electromagnet 13 in the same way as for the magnetically hard core.

In the alternative embodiment illustrated in FIG. 4, the electromagnet coil 13 is arranged so that the variable magnetic field of the coil 13 acts directly on the permanent magnet 4. To this end, the electromagnet 13 is arranged in the housing 11 of the measuring device 1 coaxially with and above the permanent magnet 4.

Figure 6:
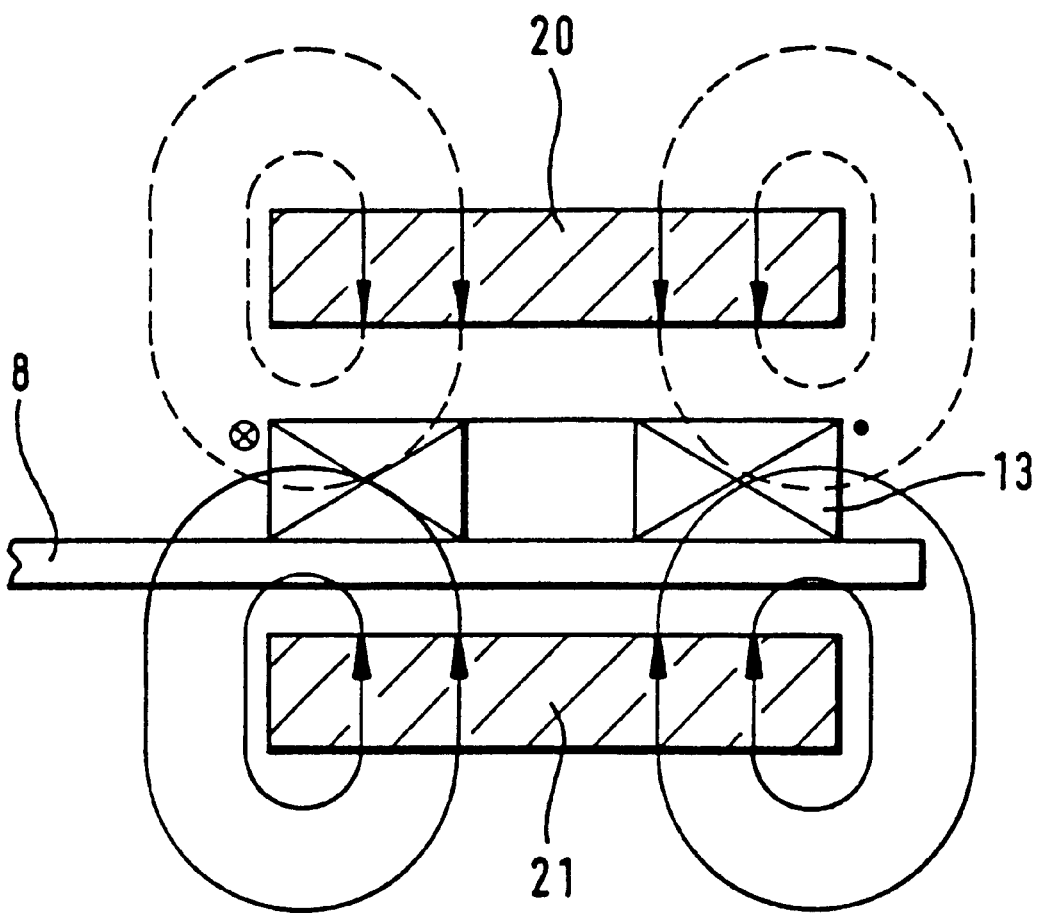
FIG. 6 is an enlarged view of the layout of the electromagnet between two permanent magnets.

Furthermore, the thickness-measuring device 1 proposed by the invention may also be of the design illustrated in FIGS. 5 and 6. In this case, the electromagnet 13 is attached to the rotary system 6 at the rear end of the lever arm 8 and is arranged so that it can be displaced between the two permanent magnets 20, 21. These magnets remain stationary relative to the point of rotation of the rotary system 6. As illustrated in detail in FIG. 6, the two permanent magnets 20, 21 are magnetized to opposite poles so that the magnetic fields of the two permanent magnets 20, 21 intersect in the region of the electromagnet 13. This is a particularly effective way of increasing the force of the magnetic field from the electromagnet 13 acting on the rotary system 6.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

What is claimed is:

1. A thickness-measuring device for films on bases in which the thickness of said film is determined from the magnetic adhesive force of a permanent magnet on said film, the device comprising:

a rotary system including a lever arm having front and rear sections, a rotary shaft about which said lever arm rotates and which divides said lever arm into said front and said rear sections and a film contacting permanent magnet secured to said front section of said lever arm;

an electromagnet, including a coil attached to said rotary system lever arm rear section for generating a magnetic field, the force of which acts on a magnetic element selected from the group comprised of magnetically soft and magnetically hard elements and which is stationary relative to said rotary system;

said force of said magnetic field acts on said rotary system for pulling said permanent magnet away from said film; and means for interpreting, as a function of elapsed time of current application to said electromagnet, the value of the force required for said pulling at the instant of release of said film contacting permanent magnet from said film as a measure of the thickness of said film.

2. A thickness-measuring device as defined by claim 1, wherein said force is the result of a variable current for activating said coil of said electromagnet and said variable current at said instant of release is said measure of the thickness of said film.

3. A thickness-measuring device as defined by claim 1, wherein said means for interpreting the value of said force as said permanent magnet is pulled away from said film is converted into said measure of the thickness of said film by an electronic system comprising a display means for indicating said measure of thickness.

4. A thickness-measuring device as defined by claim 2, wherein the value of said variable current at said instant of release as said permanent magnet is pulled away from said film is converted into said measure of the thickness of said film by means of an electronic system and a display means for indicating said measure of thickness.

5. A thickness-measuring device as defined by claim 2, wherein a point on the current curve of said coil of said electromagnet, generated at said instant of release as said permanent magnet is pulled away from said film to be measured, is detected and converted into film thickness by means of an electronic system.

6. A thickness-measuring device as defined by claim 3, wherein a point on the current curve of said coil of said electromagnet, generated at said instant of release as said permanent magnet is pulled away from said film to be measured, is detected and converted into film thickness by means of said electronic system.

7. A thickness-measuring device as defined by claim 4, wherein a point on the current curve of said coil of said electromagnet, generated at said instant of release as said permanent magnet is pulled away from said film to be measured, is detected and converted into a film thickness value by means of said electronic system.

8. A thickness-measuring device as defined by claim 5, wherein said point on said current curve as said permanent magnet is pulled away from said film is used to cut off current to said coil of said electromagnet.

9. A thickness-measuring device as defined by claim 6, wherein said point on said current curve as said permanent magnet is pulled away from said film is used to cut off current to said coil of said electromagnet.

10. A thickness-measuring device as defined by claim 7, wherein said point on said current curve as said permanent magnet is pulled away from said film is used to cut off current to said coil of said electromagnet.

11. A thickness-measuring device as defined by claim 2, wherein said coil of said electromagnet is attached to said rotary system and acts on a magnetic element which is stationary relative to said rotary system and is selected from the group comprised of magnetically soft and magnetically hard elements.

12. A thickness-measuring device as defined by claim 3, wherein said coil of said electromagnet is attached to said rotary system and acts on a magnetic element which is stationary relative to said rotary system and is selected from the group comprised of magnetically soft and magnetically hard elements.

13. A thickness-measuring device as defined by claim 4, wherein said coil of said electromagnet is attached to said rotary system and acts on a magnetic element which is stationary relative to said rotary system and is selected from the group comprised of magnetically soft and magnetically hard elements.

14. A thickness-measuring device as defined by claim 5, wherein said coil of said electromagnet is attached to said rotary system and acts on a magnetic element which is stationary relative to said rotary system and is selected from the group comprised of magnetically soft and magnetically hard elements.

15. A thickness-measuring device as defined by claim 6, wherein said coil of said electromagnet is attached to said rotary system and acts on a magnetic element which is stationary relative to said rotary system and is selected from the group comprised of magnetically soft and magnetically hard elements.

16. A thickness-measuring device as defined by claim 7, wherein said coil of said electromagnet is attached to said rotary system and acts on a magnetic element which is stationary relative to said rotary system and is selected from the group comprised of magnetically soft and magnetically hard elements.

17. A thickness-measuring device as defined by claim 8, wherein said coil of said electromagnet is attached to said rotary system and acts on a magnetic element which is stationary relative to said rotary system and is selected from the group comprised of magnetically soft and magnetically hard elements.

18. A thickness-measuring device as defined by claim 9, wherein said coil of said electromagnet is attached to said rotary system and acts on a magnetic element which is stationary relative to said rotary system and is selected from the group comprised of magnetically soft and magnetically hard elements.

19. A thickness-measuring device as defined by claim 10, wherein said coil of said electromagnet is attached to said rotary system and acts on a magnetic element which is stationary relative to said rotary system and is selected from the group comprised of magnetically soft and magnetically hard elements.

20. A thickness-measuring device as defined by claim 1, wherein said magnet element comprises two permanent magnets and said coil of said electromagnet attached to said rotary system is movable between said two permanent magnets which are stationary relative to the point of rotation of said rotary system.

21. A thickness-measuring device as defined by claim 11, wherein said coil of said electromagnet attached to said rotary system is movable between two permanent magnets which are stationary relative to the point of rotation of said rotary system.

22. A thickness-measuring device as defined by claim 12, wherein said coil of said electromagnet attached to said rotary system is movable between two permanent magnets which are stationary relative to the point of rotation of said rotary system.

23. A thickness-measuring device as defined by claim 13, wherein said coil of said electromagnet attached to said rotary system is movable between two permanent magnets which are stationary relative to the point of rotation of said rotary system.

24. A thickness-measuring device as defined by claim 14, wherein said coil of said electromagnet attached to said rotary system is movable between two permanent magnets which are stationary relative to the point of rotation of said rotary system.

25. A thickness-measuring device as defined by claim 15, wherein said coil of said electromagnet attached to said rotary system is movable between two permanent magnets which are stationary relative to the point of rotation of said rotary system.

26. A thickness-measuring device as defined by claim 16, wherein said coil of said electromagnet attached to said rotary system is movable between two permanent magnets which are stationary relative to the point of rotation of said rotary system.

27. A thickness-measuring device as defined by claim 17, wherein said coil of said electromagnet attached to said rotary system is movable between two permanent magnets which are stationary relative to the point of rotation of said rotary system.

28. A thickness-measuring device as defined by claim 18, wherein said coil of said electromagnet attached to said rotary system is movable between two permanent magnets which are stationary relative to the point of rotation of said rotary system.

29. A thickness-measuring device as defined by claim 19, wherein said coil of said electromagnet attached to said rotary system is movable between two permanent magnets which are stationary relative to the point of rotation of said rotary system.

30. A thickness-measuring device as defined by claim 20, wherein said two permanent magnets between which said coil of said electromagnet attached to said rotary system is movable are magnetized to opposite poles.

31. A thickness-measuring device as defined by claim 21, wherein said two permanent magnets between which said coil of said electromagnet attached to said rotary system is movable are magnetized to opposite poles.

32. A thickness-measuring device as defined by claim 22, wherein said two permanent magnets between which said coil of said electromagnet attached to said rotary system is movable are magnetized to opposite poles.

33. A thickness-measuring device as defined by claim 23, wherein said two permanent magnets between which said coil of said electromagnet attached to said rotary system is movable are magnetized to opposite poles.

34. A thickness-measuring device as defined by claim 24, wherein said two permanent magnets between which said coil of said electromagnet attached to said rotary system is movable are magnetized to opposite poles.

35. A thickness-measuring device as defined by claim 25, wherein said two permanent magnets between which said coil of said electromagnet attached to said rotary system is movable are magnetized to opposite poles.

36. A thickness-measuring device as defined by claim 26, wherein said two permanent magnets between which said coil of said electromagnet attached to said rotary system is movable are magnetized to opposite poles.

37. A thickness-measuring device as defined by claim 27, wherein said two permanent magnets between which said coil of said electromagnet attached to said rotary system is movable are magnetized to opposite poles.

38. A thickness-measuring device as defined by claim 28, wherein said two permanent magnets between which said coil of said electromagnet attached to said rotary system is movable are magnetized to opposite poles.

39. A thickness-measuring device as defined by claim 29, wherein said two permanent magnets between which said coil of said electromagnet attached to said rotary system is movable are magnetized to opposite poles.

40. A thickness-measuring device as defined by claim 3, wherein said electronic system comprises:

means for generating an electrical current which increases from zero and progresses linearly toward infinity for energizing said coil of said electromagnet;

means for detecting an irregularity in the linear current curve representing the application of current to said coil of said electromagnet by said means for generating an electrical current which increases from zero and progresses linearly;

means for measuring the elapsed time from the initiation of said current which increases from zero and progress linearly until the occurrence of said irregularity in said linear current curve; and means for converting said measured elapsed time into said measure of the thickness of said film.

41. A thickness-measuring device as defined by claim 40, comprising: means responsive to said occurrence of said irregularity in said linear current curve for terminating current application to said coil of said electromagnet.

42. A thickness-measuring device for non-magnetic films on magnetic bases in which the thickness of said film is determined from the magnetic adhesive force of a permanent magnet on said film, the device comprising:

a rotary system including a lever arm having front and rear sections, a rotary shaft about which said lever arm rotates and which divides said lever arm into said front and said rear sections and a film contacting permanent magnet secured to said front section of said lever arm; lever an electromagnet, including a coil attached to said rotary system lever arm rear section for generating a magnetic field, the force of which acts on a magnetic element selected from the group comprised of magnetically soft and magnetically hard elements and which is stationary relative to said rotary system; and said force of said magnetic field acts on said rotary system for pulling said permanent magnet away from said film, the value of the force required for said pulling at the instant of release of said film contacting permanent magnet from said film being a measure of the thickness of said film as a function of elapsed time of current application to said electromagnet.

43. A thickness-measuring device as defined by claim 42 wherein said magnetic base is ferromagnetic.

44. A thickness-measuring device for weak magnetic films on bases in which the thickness of said film is determined from the magnetic adhesive force of a permanent magnet on said film, the device comprising:

a rotary system including a lever arm having front and rear sections, a rotary shaft about which said lever arm rotates and which divides said lever arm into said front and said rear sections and a film contacting permanent magnet secured to said front section of said lever arm;

an electromagnet, including a coil attached to said rotary system lever arm rear section for generating a magnetic field, the force of which acts on a magnetic element selected from the group comprised of magnetically soft and magnetically hard elements and which is stationary relative to said rotary system; and said force of said magnetic field acts on said rotary system for pulling said permanent magnet away from said film, the value of the force required for said pulling at the instant of release of said film contacting permanent magnet from said film being a measure of the thickness of said film as a function of elapsed time of current application to said electromagnet.

45. A thickness measuring device as defined by claim 44, wherein said weak magnetic coatings are selected from the group comprising nickel and metals having similar magnetic properties and said bases are selected from the group comprising Non-Magnetic Metallic, Non-Ferrous, Non-Metallic, Ferromagnetic and Magnetic.

46. A thickness-measuring device for magnetic films on bases in which the thickness of said film is determined from the magnetic adhesive force of a permanent magnet on said film, the device comprising:

a rotary system including a lever arm having front and rear sections, a rotary shaft about which said lever arm rotates and which divides said lever arm into said front and said rear sections and a film contacting permanent magnet secured to said front section of said lever arm;

an electromagnet, including a coil attached to said rotary system lever arm rear section for generating a magnetic field, the force of which acts on a magnetic element selected from the group comprised of magnetically soft and magnetically hard elements and which is stationary relative to said rotary system; and said force of said magnetic field acts on said rotary system for pulling said permanent magnet away from said film, the value of the force required for said pulling at the instant of release of said film contacting permanent magnet from said film being a measure of the thickness of said film as a function of elapsed time of current application to said electromagnet.

47. A thickness measuring device as defined by claim 46, wherein said bases are selected from the group comprising Non-Magnetic Metallic, Non-Ferrous, Non-Metallic, Ferromagnetic and Weak Magnetic.

* * * * *